United States Patent [19]

Verlier

[11] Patent Number: 4,900,288
[45] Date of Patent: Feb. 13, 1990

[54] ONE-PIECE VALVE FOR A CLOSED ENCLOSURE, ITS PRODUCTION PROCESS, AND MEANS FOR USING THIS PROCESS

[75] Inventor: Jacques Verlier, Geneva, Switzerland

[73] Assignee: Monneret Jouets, S.A., Jura, France

[21] Appl. No.: 73,446

[22] Filed: Jul. 14, 1987

[30] Foreign Application Priority Data

Jul. 17, 1986 [CH] Switzerland .......................... 2857/86
Jul. 22, 1986 [CH] Switzerland .......................... 2929/86

[51] Int. Cl.⁴ ........................ A63H 3/06; F16K 15/14
[52] U.S. Cl. .................................... 446/224; 137/843; 137/859
[58] Field of Search ............... 446/224, 222, 221, 223, 446/225, 226; 137/843, 851, 859, 860, 903, 423, 224, 225

[56] References Cited

U.S. PATENT DOCUMENTS

| | | | |
|---|---|---|---|
| 1,051,738 | 1/1913 | Kavanagh | 137/223 X |
| 1,942,959 | 1/1934 | Fenton | 137/223 X |
| 2,088,248 | 7/1937 | Perry | 137/903 X |
| 2,094,264 | 9/1937 | Crowley | 137/903 X |
| 2,589,716 | 3/1952 | Marsh | 137/223 |
| 2,604,297 | 7/1952 | Winstead | 137/223 |
| 2,795,425 | 6/1957 | Orms | 137/223 X |
| 3,048,860 | 8/1962 | Richardson | 137/223 X |
| 4,240,630 | 12/1980 | Hoffman | 137/846 |

FOREIGN PATENT DOCUMENTS

| | | | |
|---|---|---|---|
| 2024427 | 5/1970 | Fed. Rep. of Germany | 137/859 |
| 812743 | 5/1937 | France | 137/223 |
| 823498 | 1/1938 | France | 137/223 |
| 442189 | 11/1948 | Italy | 137/223 |
| 442585 | 11/1948 | Italy | 137/223 |

*Primary Examiner*—Mickey Yu
*Assistant Examiner*—D. Neal Muir
*Attorney, Agent, or Firm*—Browdy and Neimark

[57] ABSTRACT

A one-piece valve for a closed enclosure. The valve is formed in the thickness of at least a part of the wall of the enclosure. The valve comprises an inside cavity communicating with the outside of the enclosure by means of a first hole, and with the inside of the enclosure by means of at least one second hole. The valve element is an integral part of the enclosure and occupies the central part of the cavity of the enclosure. The valve can be used for closing inflatable enclosures, particularly balloons, which can be inflated or deflated at will by the user.

7 Claims, 2 Drawing Sheets

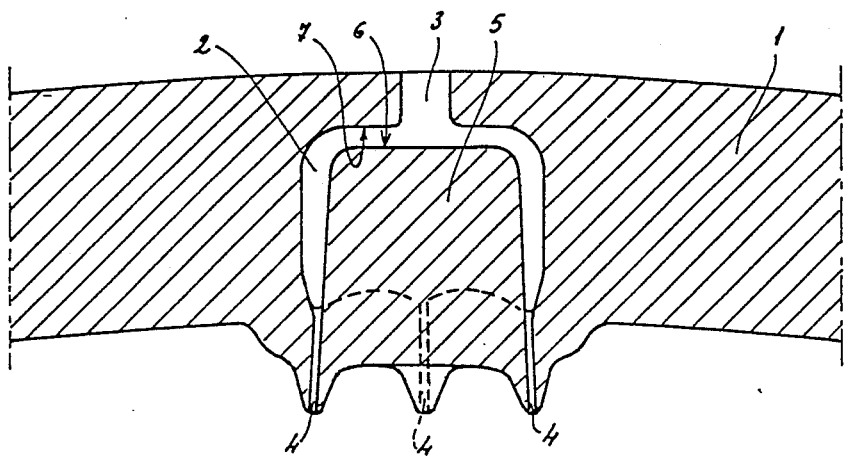
FIG_1
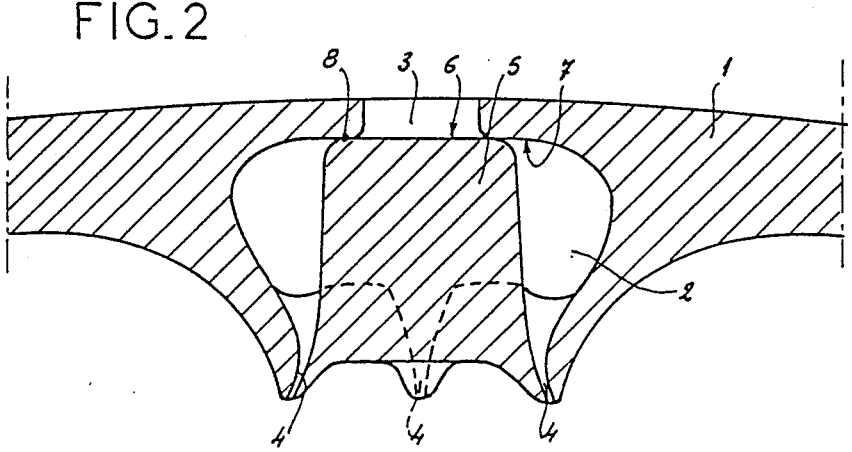
FIG_2

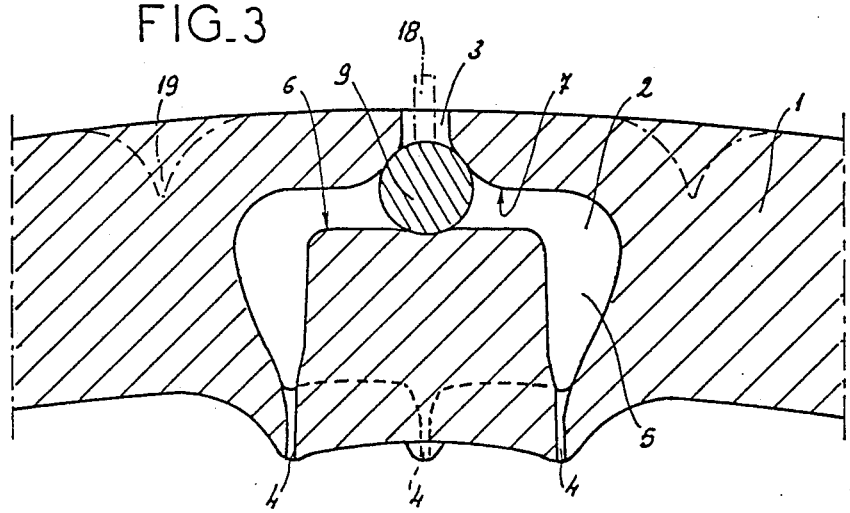
FIG_3
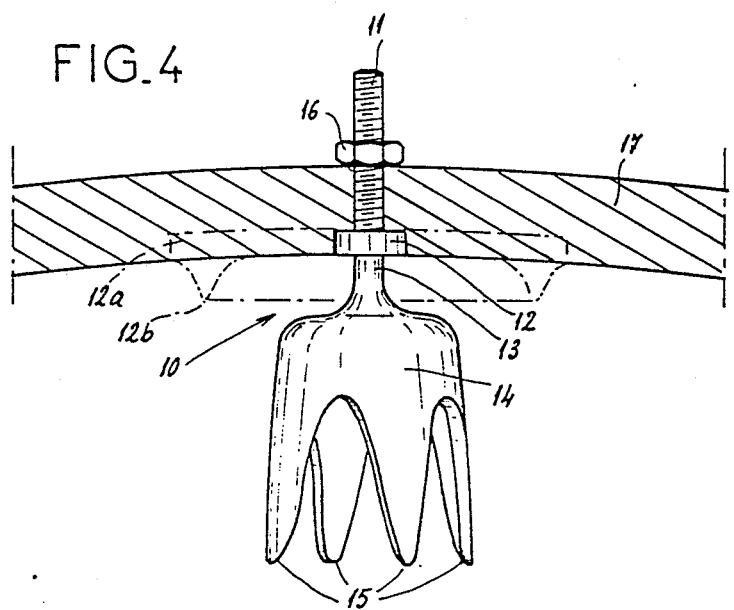
FIG_4

4,900,288

ONE-PIECE VALVE FOR A CLOSED ENCLOSURE, ITS PRODUCTION PROCESS, AND MEANS FOR USING THIS PROCESS

FIELD OF THE INVENTION

The present invention relates to a one-piece valve for a closed enclosure, a process for its production, and means for using this process.

BACKGROUND OF THE INVENTION

Valves for closed enclosure such as, particularly, an inflatable enclosure, as is known, comprise elements which constitute a body foreign to the enclosure and, most often, a part of which projects outside of the enclosure. Valves for inflatable balloons comprising a bladder, as is known, in particular for balloons made of a bladder of hot-molded synthetic material, comprise an orifice provided for inflation of the bladder. This orifice is generally made in a device which constitutes a body foreign to the bladder and which must be fastened in the mold, prior to molding, so that the device is covered by the bladder and while taking care that the orifice intake and outlet are retained.

This device has the drawback of permitting only the inflation of the bladder and not its deflation. Further, the inflating process is delicate, so that the inflation of balloons is often performed at the factory. Because the balloons cannot be deflated, their transport and storage require considerable space.

SUMMARY OF THE INVENTION

The object of the invention is to propose a one-piece valve for a closed enclosure and particularly, although not exclusively, for an inflatable enclosure and, in particular, for an inflatable balloon comprising a bladder, the valve not exhibiting any projecting element on the outside surface of the enclosure and allowing inflation and deflation of the enclosure at any time.

For this purpose, the invention relates to a one-piece valve for a closed enclosure shaped as part of the enclosure wall. The invention also relates to an inflatable enclosure and, particularly, to an inflatable balloon comprising a bladder wherein the part of the wall in which a valve is shaped is mounted on an orifice of the balloon wall and fastened to the wall at the periphery of the orifice. It also relates to a process of producing a valve and means for using it.

BRIEF DESCRIPTION OF THE DRAWINGS

The invention will be better understood from the following description, with reference to the accompanying diagrammatic drawing representing, by way of nonlimiting example, an embodiment of this valve in the case of its application to a balloon:

FIG. 1 is a partial view in radial section of an inflatable balloon comprising a bladder equipped with a valve according to the invention, before inflation of the bladder;

FIG. 2 is a partial view in radial section of the ballon of FIG. 1, the bladder being under pressure after inflation of the balloon;

FIG. 3 is a partial view in radial section of a variant of the valve according to the invention;

FIG. 4 is a view in perspective of an example of the device intended to be screwed into the mold before molding of the enclosure, to allow making of valve by molding.

DETAILED DESCRIPTION OF THE INVENTION

As shown in FIG. 1, the balloon comprises a bladder 1 comprising a valve made in the wall of the bladder. The valve comprises an inside cavity 2 communicating with the outside of the bladder by a hole 3 and with the inside of the bladder by four holes 4. A valve element 5 in which its lower part is an integral part of the bladder occupies the central part of cavity 2. It comprises an upper front part 6 located opposite the upper inside wall 7 of the cavity. Hole 3 is located in the central part of upper wall 7 of the cavity.

When the balloon is inflated, the bladder is stretched, its thickness is reduced, and the section of hole 3 increases, just like the width of cavity 2. On the other hand, the dimensions of valve elements 5 remain approximately unchanged, the valve element being subjected to only a slight pressure in its base part. Consequently, with the height of the valve remaining practically unchanged and the thickness of the bladder diminishing, upper front wall 6 of the valve element will rest against upper inside wall 7 of the cavity.

As can be seen in FIG. 2, the dimensions of the section of hole 3 are selected so that, when the bladder is under pressure, the dimensions of the increased section of hole 3 are smaller than those of front surface 6 of the valve element; and when at least a part of front surface 6 rests against upper wall 7 of the cavity to achieve a continuous contact surface 8 around hole 3 and to prevent deflation of the balloon. Because of the considerable pressure inside the bladder when the balloon is inflated, the ducts of holes 4 are deformed, this deformation contributing, in a certain degree, to the good sealing of the valve. To deflate the balloon, it suffices to introduce an object of suitable shape on the inside of hole 3 and depress the front surface 6 of the valve element and, optionally, to give a twisting movement to the valve element to disengage holes 4, which allows the air contained inside the bladder to escape by passing through holes 4, cavity 2 and hole 3.

According to a preferred mode of the production, the valve is made by molding during molding of the bladder. FIG. 4 represents, by way of example, a device 10 intended to be screwed into the mold making it possible to mold the valve. Device 10 comprises a threaded rod 11, a disk 12 of diameter greater than that of rod 11 and located at one of the ends of rod 11, and a rod element 13 located on the other side of disk 12 and extended by a bell-shaped element 14. Rod 11, disk 12, rod 13 and bell-shaped element 14 are coaxial and constitute a one-piece unit. The wall of the bell-shaped element is thin and comprises four punched out parts shaped to constitute four projecting parts 15. Threaded rod 11 of the device is intended to be introduced into a mold hole 17 before molding of the bladder, a nut 16 permitting the device to be locked onto the mold. The device enables the valve to be made during molding of the bladder, rod 13, bell 14 and projecting parts 15, respectively, enable making of hole 3, cavity 2 and holes 4 of the valve, the material that is housed inside the bell during molding constituting valve element 5.

When molding of the bladder is completed, removal of the bladder from the mold is performed simply by separating the mold from the bladder. Device 10, which remains fastened to the mold, is removed more easily from the bladder. The valve is thus made.

The above description refers to an inflatable balloon comprising a bladder equipped with a valve according to the invention. Of course, the valve of the invention can be made in the thickness of the entire enclosure or part of the enclosure which it is desired to fill with air, for example, an inflatable boat or an inflatable buoy. When an enclosure is made of a material that is not very elastic, it can be useful to provide the valve with an additional blocking element.

In the example shown in FIG. 3, the valve comprises a ball 9, for example of rubber, synthetic material, steel or any other metal, of a diameter greater than the diameter of hole 3 when the bladder is under pressure. This ball is placed at the base of hole 3, on front surface 6 of the valve element, to be compressed between the part of upper wall 7 of the cavity located at the base of hole 3 and front surface 6 of the valve element, when the enclosure is under pressure.

In a variant aimed at facilitating deflation of the enclosure, ball-shaped element 9 can be equipped with a maneuvering rod 18 going through first hole 3 to be accessible from the outside of the enclosure, as shown in mixed lines in FIG. 3.

As shown the dotted lines in FIG. 4, disk 12 which surrounds the foot of fastening rod 11 of bell part 14 can be replaced by a disk 12a forming an annular flange of a diameter greater than that of disk 12 and whose face turned toward the inside of the enclosure carries an annular rib 12b intended to create, in the wall of the enclosure, when it is being molded, an annular groove 19 of cross section complementary to that of rib 12b and which is represented in mixed lines in FIG. 3. This groove 19 gives the corresponding part of the wall of the enclosure, i.e., that which encloses the valve, a better uniform thickness.

The valve which has just been described can also be made by molding a small-surface element, this surface element then being fastened, for example by gluing or welding, to any enclosure, whether inflatable or not, as for example an inflatable boat or inflatable buoy, a vaporizer or a tube containing a pasty product to be distributed in small doses. In this latter case, the valve has the function of undesirable introduction of products into the tube, after it has been filled.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A one-piece valve in combination with an enclosure, said enclosure comprising a continuous molded wall forming an interior and an exterior and having one opening therein, said valve molded within said opening in said wall, said valve including a molded, integral sealing element which is larger than said opening and adapted to seal against said opening, and having at least one cavity extending from an opening around the said sealing element;

said cavity further including an element communicating with the interior of said enclosure, whereupon pressure applied internally of the enclosure causes said sealing element to seal against said opening as said at least one cavity communicating element is forced closed by tension in said molded wall.

2. A valve according to claim 1 further including a maneuver rod passing through said opening.

3. A valve according to claim 1 wherein the enclosure is made of a hot-molded synthetic material.

4. A valve according to claim 1 wherein the enclosure includes a part wherein the valve is shaped, and the part of the enclosure wall in which the valve is shaped is mounted on an orifice of the enclosure wall and fastened to said wall at the periphery of the orifice.

5. A valve according to claim 4 wherein the part of the wall in which the valve is shaped is subjected to pressure before being fastened to the enclosure wall.

6. A valve in accordance with claim 1 wherein said valve valve is molded in the wall of the enclosure during the molding of the wall of the enclosure.

7. A valve in accordance with claim 1 wherein the enclosure contains a fluid under pressure.

* * * * *